(12) United States Patent
Levasseur

(10) Patent No.: US 8,434,309 B2
(45) Date of Patent: May 7, 2013

(54) TRANSLATING CORE COWL HAVING AERODYNAMIC FLAP SECTIONS

(75) Inventor: Glenn Levasseur, Colchester, CT (US)

(73) Assignee: United Technologies Corporation, Hartford, CT (US)

(*) Notice: Subject to any disclaimer, the term of this patent is extended or adjusted under 35 U.S.C. 154(b) by 1071 days.

(21) Appl. No.: 12/443,887

(22) PCT Filed: Oct. 12, 2006

(86) PCT No.: PCT/US2006/039951
§ 371 (c)(1),
(2), (4) Date: Apr. 1, 2009

(87) PCT Pub. No.: WO2008/045067
PCT Pub. Date: Apr. 17, 2008

(65) Prior Publication Data
US 2010/0115914 A1 May 13, 2010

(51) Int. Cl.
*F02K 1/00* (2006.01)
(52) U.S. Cl.
USPC .......................................... 60/771; 60/226.3
(58) Field of Classification Search ............ 60/771, 60/226.3, 226.2
See application file for complete search history.

(56) References Cited

U.S. PATENT DOCUMENTS

| | | | |
|---|---|---|---|
| 3,422,624 A | 1/1969 | Brooks et al. | |
| 3,910,375 A * | 10/1975 | Hache et al. | 181/215 |
| 4,073,440 A | 2/1978 | Hapke | |
| 5,782,431 A | 7/1998 | Gar-Or et al. | |
| 7,127,880 B2 * | 10/2006 | Lair et al. | 60/204 |

FOREIGN PATENT DOCUMENTS

| | | |
|---|---|---|
| DE | 1234099 | 2/1967 |
| EP | 0913570 A2 | 5/1999 |
| EP | 1130243 A2 | 9/2001 |
| JP | 11159399 | 6/1999 |

OTHER PUBLICATIONS

Gas Power Cycle_Jet Propulsion Technology, A Case Study: From Machine Design Magazine, Nov. 5, 1998.*
International Search Report and Written Opinion of the International Searching Authority for International application No. PCT/US2006/039951 mailed Nov. 30, 2007.
International Preliminary Report on Patentability for International application No. PCT/US2006/039951 mailed Aug. 13, 2008.

* cited by examiner

*Primary Examiner* — Phutthiwat Wongwian
*Assistant Examiner* — Vikansha Dwivedi
(74) *Attorney, Agent, or Firm* — Carlson, Gaskey & Olds PC

(57) ABSTRACT

An example core nacelle for a gas turbine engine includes a core cowl positioned adjacent an inner duct boundary of a fan bypass passage having an associated discharge airflow cross-sectional area. The core cowl includes at least one translating section and at least one flap section. The translating section of the core cowl is selectively moveable to vary the discharge airflow cross-sectional area.

20 Claims, 3 Drawing Sheets

TRANSLATING CORE COWL HAVING AERODYNAMIC FLAP SECTIONS

BACKGROUND OF THE INVENTION

This invention generally relates to a gas turbine engine, and more particularly to a turbofan gas turbine engine having a translating core cowl for varying a discharge airflow cross-sectional area of the gas turbine engine.

In an aircraft gas turbine engine, such as a turbofan engine, air is pressurized in a compressor, and mixed with fuel and burned in a combustor for generating hot combustion gases. The hot combustion gases flow downstream through turbine stages that extract energy from the gases. A high pressure turbine powers the compressor, while a low pressure turbine powers a fan section disposed upstream of the compressor.

Combustion gases are discharged from the turbofan engine through a core exhaust nozzle, and fan air is discharged through an annular fan exhaust nozzle defined at least partially by a fan nacelle surrounding the core engine. A significant amount of propulsion thrust is provided by the pressurized fan air which is discharged through the fan exhaust nozzle. The combustion gases are discharged through the core exhaust nozzle to provide additional thrust.

A significant amount of the air pressurized by the fan section bypasses the engine for generating propulsion thrust in turbofan engines. High bypass turbofans typically require large diameter fans to achieve adequate turbofan engine efficiency. Therefore, the nacelle of the turbofan engine must be large enough to support the large diameter fan of the turbofan engine. Disadvantageously, the relatively large size of the nacelle results in increased weight, noise and drag that may offset the propulsive efficiency achieved by the high bypass turbofan engine.

It is known in the field of aircraft gas turbine engines that the performance of the turbofan engine varies during diverse flight conditions experienced by the aircraft. Typical turbofan engines are designed to achieve maximum performance during normal cruise operation of the aircraft. Therefore, when combined with the necessity of a relatively large nacelle size, increased noise and decreased efficiency may be experienced by the aircraft at non-cruise operating conditions such as take-off, landing, cruise maneuver and the like.

Accordingly, it is desirable to provide a turbofan engine having a variable discharge airflow cross-sectional area that achieves improved engine performance and reduced flow disturbances of a fan discharge airflow.

SUMMARY OF THE INVENTION

An example core nacelle for a gas turbine engine includes a core cowl positioned adjacent an inner duct boundary of a fan bypass passage having an associated discharge airflow cross-sectional area. The core cowl includes at least one translating section and at least one flap section. The translating section of the core cowl is selectively moveable to vary the discharge airflow cross-sectional area.

An example gas turbine engine system includes a fan nacelle having a fan exhaust nozzle, a core nacelle within the fan nacelle, a core cowl having a translating section and a flap section, a sensor that produces a signal representing an operability condition and a controller in communication with the sensor to translate the core cowl between a first position and a second position. The first position includes a first discharge airflow cross-sectional area and the second position includes a second discharge airflow cross-sectional area greater than the first discharge airflow area. The core cowl is moved between the first position and the second position in response to detecting the operability condition.

An example method of controlling a discharge airflow cross-sectional area of a gas turbine engine includes sensing an operability condition and translating a core cowl in response to sensing the operability condition. In one example, the operability condition includes at least one of a takeoff condition and a landing condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
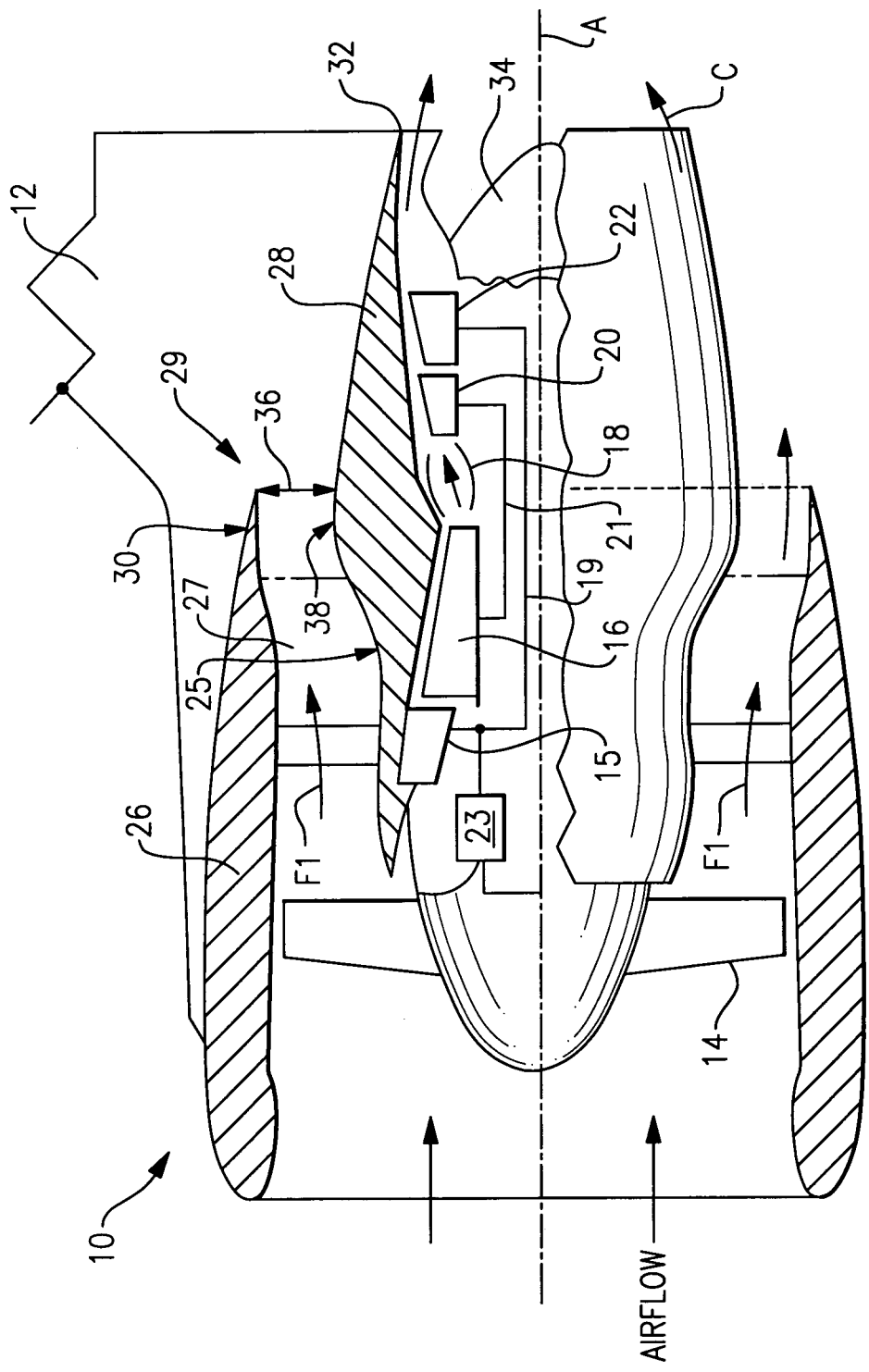
FIG. 1 illustrates a general perspective view of an example gas turbine engine.

Referring to FIG. 1, a gas turbine engine 10 suspends from an engine pylon 12 as is typical of an aircraft designed for subsonic operation. In one example, the gas turbine engine is a geared turbofan aircraft engine. The gas turbine engine 10 includes a fan section 14, a low pressure compressor 15, a high pressure compressor 16, a combustor 18, a high pressure turbine 20 and a low pressure turbine 22. A low speed shaft 19 rotationally supports the low pressure compressor 15 and the low pressure turbine 22 and drives the fan section 14 through a gear train 23. A high speed shaft 21 rotationally supports the high pressure compressor 16 and a high pressure turbine 20. The low speed shaft 19 and the high speed shaft 21 rotate about a longitudinal centerline axis A of the gas turbine engine 10.

During operation, air is pressurized in the compressors 15, 16 and is mixed with fuel and burned in the combustor 18 for generating hot combustion gases. The hot combustion gases flow through the high and low pressure turbines 20, 22 which extract energy from the hot combustion gases.

The example gas turbine engine 10 is in the form of a high bypass ratio (i.e., low fan pressure ratio geared) turbofan engine mounted within a fan nacelle 26, in which most of the air pressurized by the fan section 14 bypasses the core engine itself for the generation of propulsion thrust. The example illustrated in FIG. 1 depicts a high bypass flow arrangement in which approximately 80% of the airflow entering the fan nacelle 26 may bypass the core nacelle 28 via a fan bypass passage 27. The high bypass flow arrangement provides a significant amount of thrust for powering the aircraft.

In one example, the bypass ratio is greater than ten, and the fan section 14 diameter is substantially larger than the diameter of the low pressure compressor 15. The low pressure turbine 22 has a pressure ratio that is greater than five, in one example. The gear train 23 can be any known gear system, such as a planetary gear system with orbiting planet gears, planetary system with non-orbiting planet gears, or other type of gear system. In the disclosed example, the gear train 23 has a constant gear ratio. It should be understood, however, that the above parameters are only exemplary of a contemplated geared turbofan engine. That is, the invention is applicable to other engine architectures.

A fan discharge airflow F1 is communicated within the fan bypass passage 27 and is discharged from the engine 10 through a fan exhaust nozzle 30, defined radially between a core nacelle 28 and the fan nacelle 26. Core exhaust gases C are discharged form the core nacelle 28 through a core exhaust nozzle 32 defined between the core nacelle 28 and a tail cone 34 disposed coaxially therein around the longitudinal centerline axis A of the gas turbine engine 10.

The fan exhaust nozzle 30 concentrically surrounds the core nacelle 28 near an aftmost segment 29 of the fan nacelle 26, in this example. In other examples, the fan exhaust nozzle 30 is located farther upstream but aft of the fan section 14. The fan exhaust nozzle 30 defines a discharge airflow cross-sectional area 36 between the fan nacelle 26 and the core nacelle 28 for axially discharging the fan discharge airflow F1 pressurized by the upstream fan section 14.

Figure 2:
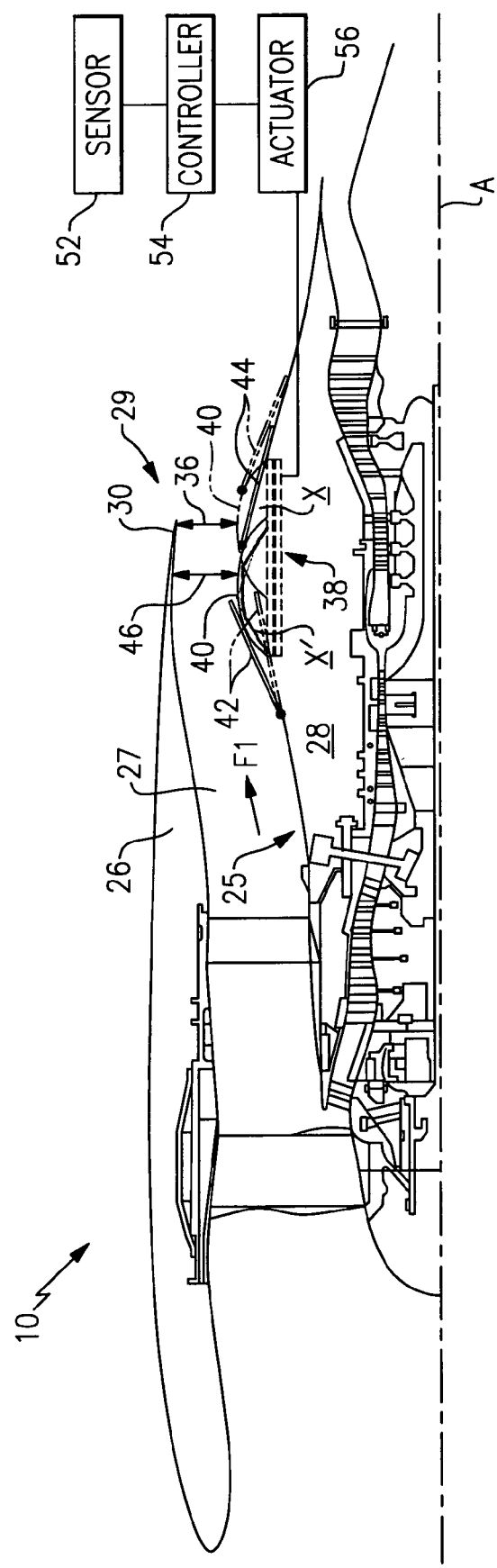
FIG. 2 is a schematic view of an example gas turbine engine having a core cowl moveable between a first position and a second position.
Figure 4:
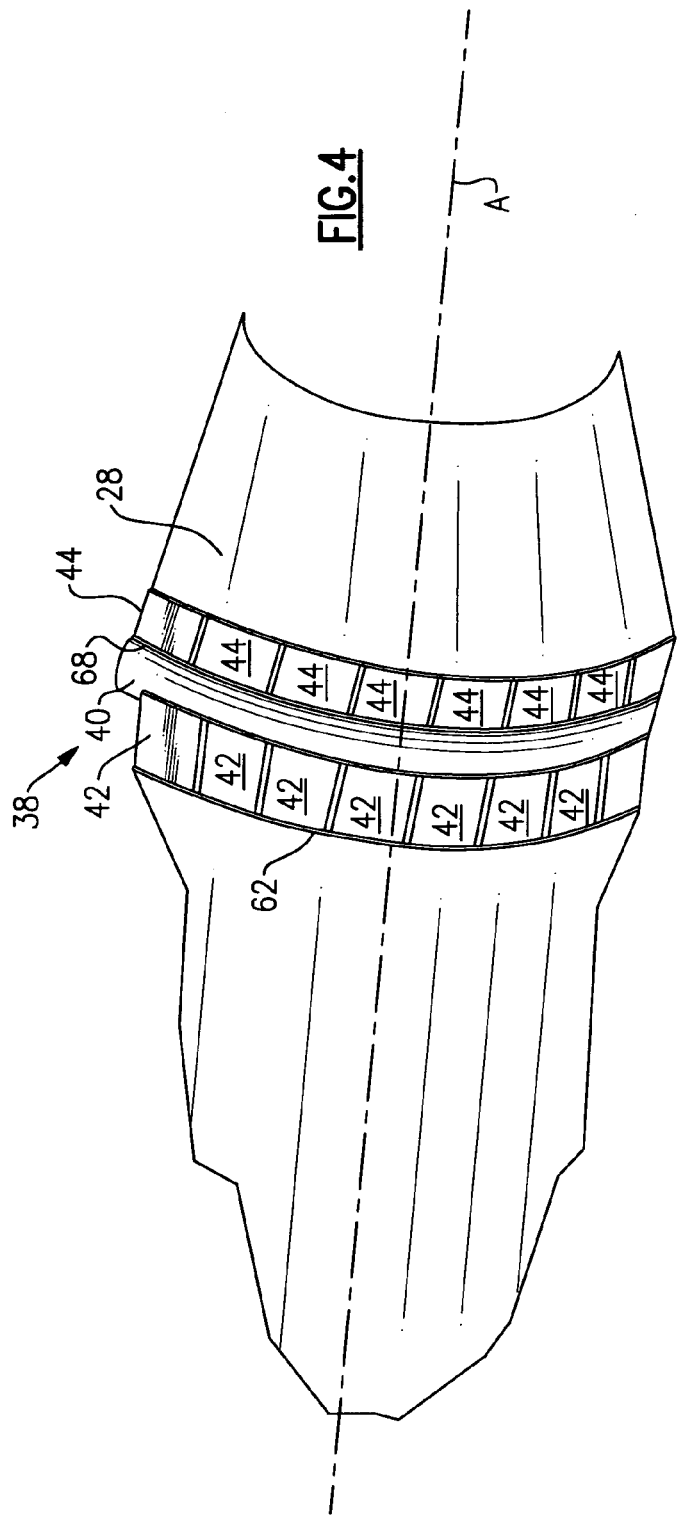
FIG. 4 illustrates a partial perspective view of an example configuration of the core cowl about an engine centerline axis.

FIG. 2 illustrates a core cowl 38 of the gas turbine engine 10. The core cowl 38 represents an exterior flow surface of a section of the core nacelle 28. The core cowl 38 is positioned adjacent an inner duct boundary 25 of the fan bypass passage 27. The example core cowl 38 includes a center section 40, and a plurality of leading edge flaps 42 and trailing edge flaps 44 disposed circumferentially about engine centerline axis A (See FIG. 4). In one example, the center section 40 of the core cowl 38 is positioned adjacent the fan exhaust nozzle 30 (e.g., axially aligned). The actual positioning and configuration of the core cowl 38 will vary depending upon design specific parameters including, but not limited to, the size of the core nacelle and the efficiency requirements of the gas turbine engine 10.

In the illustrated example, the discharge airflow cross-sectional area 36 extends between the aft most segment 29 of the fan nacelle 26 adjacent to fan exhaust nozzle 30 and the center section 40 of the core cowl. Varying the discharge airflow cross-sectional area 36 of the gas turbine engine 10 during specific flight conditions provides improved efficiency of the gas turbine engine 10 with minimal disturbance of the fan airflow F1 as the fan airflow F1 is communicated through the fan bypass passage 27, as is further discussed below. In one example, the discharge airflow cross-sectional area 36 is varied by translating the center section 40 of the core cowl 38 forward (i.e., upstream) from its position adjacent the fan exhaust nozzle 30.

The core cowl 38 is moved from a first position X (i.e., the position adjacent the fan exhaust nozzle 30, represented by phantom lines) to a second position X' (represented by solid lines) in response to detecting an operability condition of the gas turbine engine 10, in one example. In another example, the core cowl 38 is selectively moveable between a plurality of positions each having different discharge airflow cross sectional areas.

In the illustrated example, a discharge airflow cross-sectional area 46 associated with the second position X' is greater than the discharge airflow cross-sectional area of the first position X. In one example, the operability condition includes a takeoff condition. In another example, the operability condition includes a landing condition. However, the core cowl 38 may be translated between the first position X and the second position X', or any other position between the first position X and the second position X', in response to any known operability condition.

A sensor 52 detects the operability condition and communicates with a controller 54 to translate the core cowl 38 between the first position X and the second position X' via an actuator assembly 56. Of course, this view is highly schematic. It should be understood that the sensor 52 and the controller 54 are programmable to detect known flight conditions. A person of ordinary skill in the art having the benefit of the teachings herein would be able to program the controller 54 to communicate with the actuator assembly 56 to translate the core cowl 38 between the first position X and the second position X'.

The distance the core cowl 38 translates in response to detecting the operability condition will vary depending on design specific parameters. The actuator assembly 56 returns the center section 40 of the core cowl 38 to the first position X during normal cruise operation (e.g., a generally constant speed at generally constant, elevated altitude) of the aircraft. The discharge airflow cross-sectional area 46 permits an increased amount of fan airflow F1 to exit the fan exhaust nozzle 30 as compared to the discharge airflow cross-sectional area 36. Therefore, the design of the fan section 14 may be optimized for diverse operability conditions of the aircraft.

Figure 3:
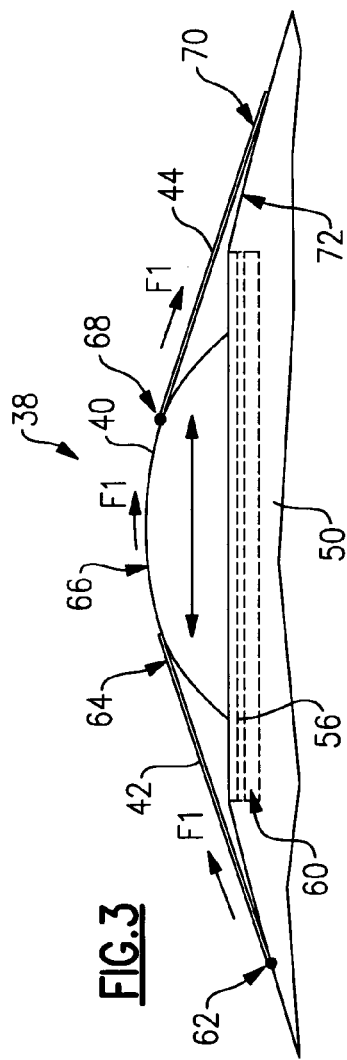
FIG. 3 illustrates an exploded cross-sectional view of an example configuration of the core cowl illustrated in FIG. 2.

FIG. 3 illustrates an example configuration of the core cowl 38. The example center section 40 of the core cowl 38 is slidably secured to a stationary section 50 of the core cowl 38. The center section 40 is axially translatable along the stationary section 50 of the core cowl 38 in a direction parallel to the longitudinal centerline axis A.

The stationary section 50 includes a cavity 60 for storing the actuator assembly 56. In one example, the actuator assembly 56 includes internal linkages. In another example, the actuator assembly 56 includes a ball screw. The actuator assembly 56 may use hydraulic, electromechanical, electrical or any other power source to translate the center section 40 of the core cowl 38.

A leading edge 62 of the leading edge flap 42 is affixed to the stationary section 50 of the core cowl 38. In one example, the leading edge 62 of the leading edge flap 42 is affixed to the stationary section 50 of the core cowl via a hinged mount. The trailing edge 64 of the leading edge flap 42 is not affixed to the core cowl 38. That is, the trailing edge 64 of the leading edge flap 42 is movable along an exterior surface 66 of the center section 40 as the center section 40 is translated between positions X and X'.

A leading edge 68 of the trailing edge flap 44 is affixed to the center section 40 of the core cowl 38. In one example, the leading edge 68 is affixed to the center section 40 via a hinged mount. The trailing edge 70 of the trailing edge flap 44 is not affixed to the core cowl 38. That is, the trailing edge 70 of the trailing edge flap 44 is free to translate along an exterior surface 72 of the stationary section 50 as the center section 40 translates between positions X and X'. It should be understood that an opposite configuration, in which the trailing edges 64, 70 of the edge flaps 42, 44 are affixed to the core cowl 38 and the leading edges 62, 68 are free to translate with respect to the core cowl 38, is contemplated as within the scope of this invention.

Although slideable along portions of the core cowl 38, the leading edges 62, 68 of the leading edge flap 42 and the trailing edge flap 44 are prevented from lifting away from the core cowl 38 and creating a gap between the edge flaps 42, 44 and the core cowl 38 by the downstream flowing fan airflow F1. In one example, the core cowl 38 includes a plurality of the edge flaps 42, 44 that are circumferentially spaced about the longitudinal centerline axis A of the gas turbine engine (See FIG. 4). The edge flaps 42, 44, due in part to their circumferential spacing and in part to their slideable trailing edges 64, 70, maintain an aerodynamic flow surface for the fan airflow F1 as the fan airflow F1 is communicated downstream within the fan bypass passage 27. Advantageously, flow disturbance of the fan airflow F1 is minimized resulting in improved engine operability and efficiency.

The edge flaps 42, 44 optionally comprise a shape memory alloy having a first solid phase that corresponds to a first shape of the edge flaps 42, 44 and a second solid state that corresponds to a second shape of the edge flaps 42, 44. For example, the shape memory alloy is thermally or magnetically active to reversibly transition the shape memory alloy between the phases to change the shape of the edge flaps 42, 44.

In one example, the entire surfaces of the edge flaps 42, 44 include a shape memory alloy. In another example, only the leading edges 62, 68 and the trailing edges 64, 70 of the edge flaps 42, 44 include a shape memory alloy.

One example thermally active shape memory alloy includes a nickel-titanium alloy. A second example thermally active shape memory alloy includes a copper-zinc-aluminum alloy. Yet another example thermally active shape memory alloy includes a copper-aluminum-nickel alloy. One example magnetically active shape memory alloy includes a nickel-manganese-gallium alloy. However, other shape memory alloys may be utilized, as would be understood by those of skill in the art having the benefit of this disclosure. In combination with a source that provides heat or a magnetic field, the shape memory alloy further enhances the flow contours of the core cowl 38 for improved flow of the fan airflow F1 through the fan bypass passage 27 and provides improved sealing between the center section 40 and the edge flaps 42, 44.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. A core nacelle comprising:
   a core cowl positioned adjacent an inner duct boundary of a fan bypass passage having an associated discharge airflow cross-sectional area, wherein said core cowl includes a center section and at least one flap section in contact with an exterior surface of said center section, said center section being selectively axially translatable to vary said discharge airflow cross-sectional area.

2. The core nacelle as recited in claim 1, wherein said discharge airflow cross-sectional area is defined between an inner surface of a fan nacelle and an outer surface of said center section.

3. The core nacelle as recited in claim 1, wherein said at least one flap section includes a first flap and a second flap aft of said first flap, wherein a leading edge of one of said first flap and said second flap is affixed to said core cowl and a leading edge of the other of said first flap and said second flap is affixed to said center section of said core cowl.

4. The core nacelle as recited in claim 3, wherein a trailing edge of each of said first flap and said second flap is slideable relative to one of said center section and said core cowl to provide an aerodynamic flow surface for a fan airflow.

5. The core nacelle as recited in claim 4, wherein at least said leading edges and said trailing edges of said first flap and said second flap comprise a shape memory alloy having a first solid state phase that corresponds to a first shape of said first flap and said second flap and a second solid state phase that corresponds to a second shape of said first flap and said second flap.

6. The core nacelle as recited in claim 3, wherein said center section of said core cowl is moveable to vary said discharge airflow cross-sectional area, wherein one of said first flap and said second flap slides against said center section and the other of said first flap and said second flap slides against a stationary section of said core cowl in response to moving said at center section.

7. The core nacelle as recited in claim 1, wherein said at least one flap section includes a plurality of flap sections, wherein said plurality of flap sections are circumferentially spaced about a longitudinal centerline axis of a gas turbine engine.

8. A gas turbine engine system, comprising:
   a fan nacelle defined about an axis and having a fan exhaust nozzle;
   a core nacelle having a core cowl including a center section and at least one flap section, wherein said center section of said core cowl is selectively axially moveable between a first position having a first discharge airflow cross-sectional area and a second position having a second discharge airflow cross-sectional area greater than said first discharge airflow cross-sectional area;
   a turbofan positioned within said fan nacelle;
   a gear train that drives at least said turbofan;
   at least one compressor and at least one turbine positioned downstream of said turbofan;
   at least one combustor positioned between said at least one compressor and said at least one turbine;
   at least one sensor that produces a signal representing an operability condition; and
   a controller that receives said signal, wherein said controller selectively moves said center section of said core cowl between said first position and said second position in response to said signal.

9. The system as recited in claim 8, comprising an actuator assembly in communication with said controller and operable to move said center section of said core cowl between said first position and said second position.

10. The system as recited in claim 9, wherein said actuator assembly is mounted within a cavity of a stationary section of said core cowl, wherein said actuator assembly includes at least one of a ball screw and internal linkages.

11. The system as recited in claim 8, wherein said second position is upstream from said first position.

12. The system as recited in claim 8, wherein said center section is axially translatable between said first position and said second position.

13. The system as recited in claim 8, wherein said center section is axially moveable between a plurality of positions between said first position and said second position.

14. The system as recited in claim 8, wherein said operability condition includes at least one of a take-off condition and a landing condition.

15. A method of controlling the discharge airflow cross-sectional area of a gas turbine engine, comprising the steps of:
   (a) sensing an operability condition; and
   (b) selectively axially translating a center section of a core cowl to vary the discharge airflow cross-sectional area of a fan bypass passage in response to sensing the operability condition.

16. The method as recited in claim 15, wherein the operability condition includes at least one of a take-off condition and a landing condition.

17. The method as recited in claim 15, wherein the center section is selectively moveable between a first position having a first discharge airflow cross-sectional area and a second position having a second discharge airflow cross-sectional area greater than the first discharge airflow area, wherein said step (b) comprises:

translating the center section of the core cowl assembly from the first position to the second position in response to sensing the operability condition.

18. The method as recited in claim 17, comprising the step of:

(c) returning the center section of the core cowl to the first position in response to detection of a cruise operation.

19. The method as recited in claim 15, wherein the core cowl includes a stationary section, the center section, at least one leading edge flap and at least one trailing edge flap and said step (b) comprises:

moving the center section of the core cowl in an upstream direction;

sliding one of the at least one leading edge flap and the at least one trailing edge flap along an exterior surface of the center section; and sliding the other of the at least one leading edge flap and the at least one trailing edge flap along the stationary section of the core cowl.

20. The core nacelle as recited in claim 1, wherein said center section is slidably secured to a stationary section of said core cowl, and said center section is axially translatable along said stationary section of said core cowl in a direction parallel to a longitudinal centerline axis of said core cowl.

\* \* \* \* \*